(12) United States Patent
Mu et al.

(10) Patent No.: US 10,375,769 B2
(45) Date of Patent: Aug. 6, 2019

(54) HIGH-SPEED LOCOMOTIVE WINDSHIELD AND PREPARATION METHOD THEREFOR

(71) Applicants: CHINA BUILDING MATERIALS ACADEMY, Beijing (CN); BEIJING HANG BO NEW MATERIAL TECHNOLOGY CO., LTD, Beijing (CN)

(72) Inventors: Yuanchun Mu, Beijing (CN); Dayan Du, Beijing (CN); Baojun Zhang, Beijing (CN); Zhiwei Xu, Beijing (CN); Yan Zuo, Beijing (CN); Jing Fu, Beijing (CN); Chaoying Liu, Beijing (CN); Fan Zhang, Beijing (CN); Wei Chen, Beijing (CN); Yang Zhang, Beijing (CN); Yanfang Zhang, Beijing (CN); Yuan An, Beijing (CN)

(73) Assignees: CHINA BUILDING MATERIALS ACADEMY, Beijing (CN); BEIJING HANG BO NEW MATERIAL TECHNOLOGY CO., LTD, Beijing (CN)

( * ) Notice: Subject to any disclaimer, the term of this patent is extended or adjusted under 35 U.S.C. 154(b) by 404 days.

(21) Appl. No.: 14/781,786

(22) PCT Filed: Apr. 29, 2014

(86) PCT No.: PCT/CN2014/076462
§ 371 (c)(1),
(2) Date: Oct. 1, 2015

(87) PCT Pub. No.: WO2015/123920
PCT Pub. Date: Aug. 27, 2015

(65) Prior Publication Data
US 2016/0249414 A1 Aug. 25, 2016

(30) Foreign Application Priority Data

Feb. 24, 2014 (CN) .......................... 2014 1 0061781

(51) Int. Cl.
*B32B 15/04* (2006.01)
*B32B 17/06* (2006.01)
(Continued)

(52) U.S. Cl.
CPC .............. *H05B 3/84* (2013.01); *B32B 17/06* (2013.01); *B32B 17/10045* (2013.01);
(Continued)

(58) Field of Classification Search
USPC .................................................. 428/426, 688
See application file for complete search history.

(56) References Cited

U.S. PATENT DOCUMENTS

| | | | | |
|---|---|---|---|---|
| 3,881,043 A | * | 4/1975 | Rieser | B32B 17/10018 428/81 |
| 4,894,513 A | * | 1/1990 | Koontz | B32B 17/10036 219/203 |

(Continued)

FOREIGN PATENT DOCUMENTS

| CN | 1524721 A | 9/2004 |
|---|---|---|
| CN | 1559950 A | 1/2005 |

(Continued)

OTHER PUBLICATIONS

FR2697829 English translation.*
(Continued)

*Primary Examiner* — Lauren R Colgan
(74) *Attorney, Agent, or Firm* — Reches Patents

(57) ABSTRACT

Provided is a windshield for a high-speed locomotive and preparation method thereof. The windshield comprises an anti-reflection film layer; a first chemical tempering glass (Continued)

layer coated with the anti-reflection film layer on a first side thereof; at least one second chemical tempering glass layer located on a second side of the first chemical tempering glass layer; the second chemical tempering glass layer being bonded together with the first chemical tempering glass layer via a layer of an adhesive film, and adjacent second chemical tempering glass layers also being bonded together via a layer of the adhesive film; an anti-splash film layer, located on an outer side of the outermost second chemical tempering glass layer and bonded together with the outermost second chemical tempering glass layer via a layer of the adhesive film; and a first electric heating element disposed inside the adhesive film layer in contact with the first chemical tempering glass layer. The windshield of the present invention can meet requirements for the high-speed locomotive, and especially can meet the safety requirements for the high-speed locomotive.

3 Claims, 2 Drawing Sheets

(51) Int. Cl.
H05B 3/84 (2006.01)
B61D 25/00 (2006.01)
C03C 17/23 (2006.01)
C03C 17/30 (2006.01)
C03C 17/34 (2006.01)
C03C 27/10 (2006.01)
B32B 37/10 (2006.01)
B32B 17/10 (2006.01)

(52) U.S. Cl.
CPC .... *B32B 17/1077* (2013.01); *B32B 17/10137* (2013.01); *B32B 17/10201* (2013.01); *B32B 17/10385* (2013.01); *B32B 37/1018* (2013.01); *B61D 25/00* (2013.01); *C03C 17/23* (2013.01); *C03C 17/30* (2013.01); *C03C 17/3417* (2013.01); *C03C 27/10* (2013.01); *B32B 2315/02* (2013.01); *B32B 2315/08* (2013.01); *B32B 2605/006* (2013.01); *B32B 2605/10* (2013.01); *C03C 2217/212* (2013.01); *C03C 2217/213* (2013.01); *C03C 2217/73* (2013.01); *C03C 2218/113* (2013.01); *H05B 2203/005* (2013.01); *H05B 2203/014* (2013.01); *Y02T 30/30* (2013.01)

(56) References Cited

U.S. PATENT DOCUMENTS

| | | | |
|---|---|---|---|
| 4,898,789 A | | 2/1990 | Finley |
| 5,733,660 A | * | 3/1998 | Makita .............. B32B 17/10174 428/216 |
| 5,798,499 A | * | 8/1998 | Shibata .................... H05B 3/84 219/203 |
| 6,068,914 A | * | 5/2000 | Boire ................ B32B 17/10018 359/360 |
| 6,190,776 B1 | | 2/2001 | Demiryont |
| 6,387,515 B1 | * | 5/2002 | Joret ................. B32B 17/10036 428/216 |
| 8,304,078 B2 | * | 11/2012 | Varshneya ........ B32B 17/10761 428/410 |
| 2007/0020465 A1 | * | 1/2007 | Thiel ................. B32B 17/10036 428/428 |
| 2009/0324935 A1 | * | 12/2009 | Bennison .......... B32B 17/10045 428/334 |
| 2012/0164409 A1 | * | 6/2012 | Masaki ................... B32B 17/10 428/203 |
| 2015/0351160 A1 | * | 12/2015 | Phan ........................ H05B 3/84 219/203 |

FOREIGN PATENT DOCUMENTS

| | | |
|---|---|---|
| CN | 2850900 Y | 12/2006 |
| CN | 201228412 Y | 4/2009 |
| CN | 201410958 Y | 2/2010 |
| CN | 201924774 U | 8/2011 |
| CN | 103553306 A | 2/2014 |
| CN | 203698286 U | 7/2014 |
| ES | 2 049 270 T3 | 4/1994 |
| FR | 2697829 * | 5/1994 |
| WO | WO 2013175101 A1 | 11/2013 |

OTHER PUBLICATIONS

International Search Report, issued in PCT/CN2014/076462, dated Feb. 11, 2015.
The State Intellectual Property Office of China, "First Office Action," issued in connection with Chinese Patent Application No. 201410061781.5, dated Sep. 1, 2015.

* cited by examiner

HIGH-SPEED LOCOMOTIVE WINDSHIELD AND PREPARATION METHOD THEREFOR

FIELD OF THE INVENTION

The present invention relates to the technical field of glasses and preparations thereof, and more particularly to a windshield for a high-speed locomotive and preparation method thereof.

BACKGROUND OF THE INVENTION

Among land, sea and air transport systems consisting of aircrafts, trains, automobiles and ships, railway transport systems gradually win a first place and become a most important transport system during competing with other transport systems due to many advantages such as large freight volume, high transportation speed, long transportation distance, low transportation cost and low pollution. A high-speed locomotive is able to convey a large quantities of goods and people to a faraway place in a shorter time, and can drive a rapid economic development in areas along the railway and even in the country, thus become the best in the railway transport system. The speed of passenger trains has exceeded 240 km/h in 25 countries around the world in the early 2005. Now a high-speed locomotive usually has a running speed around 300 km/h, and around 340 km/h at the highest. These countries have the world's leading technology for windshields for the high-speed locomotive. There seems to be no problems to import windshields from abroad when the running speed of the domestic high-speed locomotive is lower than that of the high-speed locomotive abroad. However, as the running speed of the domestic high-speed locomotive is increased to be far higher than that of the high-speed locomotive abroad, a problem arises that there are no existent windshields for the high-speed locomotive abroad to be imported, and this problem is increasingly serious. In addition, China has become from an importer to an exporter when the domestic high-speed locomotive technology becomes world's leading, and how to provide windshields becomes a problem that needs to be solved.

Now, front windshields used on most trains in China are common glasses which are safe for use under the ordinary conditions with low speed, so these front windshields are unable to meet the safety requirements for the high-speed locomotives, especially for the high-speed locomotives having a speed higher than 380 km/h. In addition, the high-speed locomotive front windshield is generally for outdoor use, and in winter the temperature is low and there are usually a lot of ice and snow in the northern regions. It will affect the driver's view, even seriously endanger the safety of the locomotive and reduce the lifetime of the front windshield if there are ice and snow condensed at the surface of the high-speed locomotive front windshield and not being cleared promptly.

SUMMARY OF THE INVENTION

An object of the present invention is to provide a windshield for a high-speed locomotive.

In order to achieve the object, a technical solution described as blow is adopted in the present invention.

A windshield for a high-speed locomotive, comprising
an anti-reflection film layer;
a first chemical tempering glass layer, coated with the anti-reflection film layer on a first side thereof;
at least one second chemical tempering glass layer located on a second side of the first chemical tempering glass layer, wherein the second chemical tempering glass layer is bonded together with the first chemical tempering glass layer via a layer of an adhesive film, and adjacent second chemical tempering glass layers are also being bonded together via a layer of the adhesive film;
an anti-splash film layer, located on an outer side of an outermost second chemical tempering glass layer and bonded together with the outermost second chemical tempering glass layer via a layer of the adhesive film; and
an electric heating element, disposed inside the adhesive film layer located between the first chemical tempering glass layer and the second chemical tempering glass layer.

In accordance with one embodiment, the electric heating element comprises:
at least one electric heating wire, disposed inside the adhesive film layer located between the first chemical tempering glass layer and the second chemical tempering glass layer;
an input busbar, electrically connected with a first end of each of the electric heating wires;
an output busbar, electrically connected with a second end of each of the electric heating wires;
an input wire, electrically connected with the input busbar and extended out of the windshield; and
an output wire, electrically connected with the output busbar and extended out of the windshield.

In accordance with one embodiment, the adhesive film layer is a polyurethane film and has a thickness of 1.5 mm-4 mm.

In accordance with one embodiment, the anti-splash film layer has a thickness of 0.5 mm-1.5 mm.

In accordance with one embodiment, the first chemical tempering glass layer and the second chemical tempering glass layer have a surface stress of 700 Mpa-900 Mpa and have a thickness of 4 mm-8 mm.

In accordance with one embodiment, the anti-reflection film layer is a $SiO_2$ monolayer film, a $TiO_2$ monolayer film, a $SiO_2/TiO_2$ double-layer film, a $TiO_2/SiO_2$ double-layer film, or a $SiO_2/TiO_2/SiO_2$ multilayer film.

In accordance with one embodiment, the anti-reflection film layer has a thickness of 100 nm-500 nm.

In accordance with one embodiment, the electric heating element comprises at least one first electric heating element and one second electric heating element, and the first electric heating element is in parallel connection with the second electric heating element.

The present invention also provides a method for preparing the windshield, comprising steps of:
preparing the anti-splash film layer, the adhesive film layer, the first chemical tempering glass layer coated with the anti-reflection film layer, and the second chemical tempering glass layer; and
laminating the anti-splash film layer, the adhesive film layer, the first chemical tempering glass layer and the second chemical tempering glass layer;
wherein, the adhesive film layer between the first chemical tempering glass layer and the second chemical tempering glass layer is named as a first adhesive film layer which is prepared by a process comprising steps of cutting an adhesive film into a designed size for the high-speed locomotive windshield to form an adhesive film layer, determining the amount and layout of the electric heating wire according to a heating demand, arranging the heating wire, input busbar, output busbar, input wire and output wire on the adhesive film layer, and extending the input wire and output wire out of the first adhesive film layer;

laying the first adhesive film layer on the first chemical tempering glass layer, and extending the input wire and output wire out of the windshield;

laying the second chemical tempering glass layer on the first adhesive film layer, and laying another adhesive film layer on the second chemical tempering glass layer; repeating this step to complete laying of all of the second chemical tempering glass layers and the adhesive film layers;

laying the anti-splash film layer on the last adhesive film layer;

putting the laminated anti-splash film, adhesive film layers, the first chemical tempering glass layer and the second chemical tempering glass layers into a bag;

vacuumizing the bag and reacting for 1.5 to 2.5 hours at a temperature of 125° C.-130° C. and a pressure of 1-1.5 Mpa; and removing the bag to obtain the multilayer front windshield for the high-speed locomotive.

Compared with the prior art, the present invention has the following advantages:

The windshield of the present invention can meet the running requirements of the high-speed locomotive, and especially can meet the safety requirements of the high-speed locomotive having a speed more than 380 km/h.

In addition, there are electric heating elements disposed inside the adhesive film layer, which can heat the chemical tempering glass layers of the front windshield by connecting the electric heating wire with an external power supply through the wires, so as to effectively remove snow and frost on the surface of the chemical tempering glass without affecting the transmittance of the high-speed locomotive windshield, thus avoiding the condensation and accumulation of the snow and frost at the surface of the high-speed locomotive windshield, so that the problems caused by the snow and frost such as reducing the transmittance and affecting the driver's view to cause a serious threat to the safety operation of the locomotive can be avoided, and the service life of the windshield can be extended.

BRIEF DESCRIPTION OF THE DRAWINGS

The present invention will be more clearly understood and described with reference to the embodiments in conjunction with the accompanying drawings which constitute a part of the present invention. However, it should be understood that the present invention is by no means restricted to the following embodiments and explanations thereof.

In the appended drawings, various components which are represented by symbols are listed below:

1. anti-reflection film layer; 21. first chemical tempering glass layer; 22. second chemical tempering glass layer; 3. adhesive film layer; 4. anti-splash film layer; 5. first electric heating element; 51. electric heating wire; 52. input busbar; 53. input wire; 54. output busbar; 55. output wire; 6. second electric heating element.

DETAILED EMBODIMENTS OF THE INVENTION

The present invention is further described with but is not limited to the following examples.

Example 1

Figure 1:
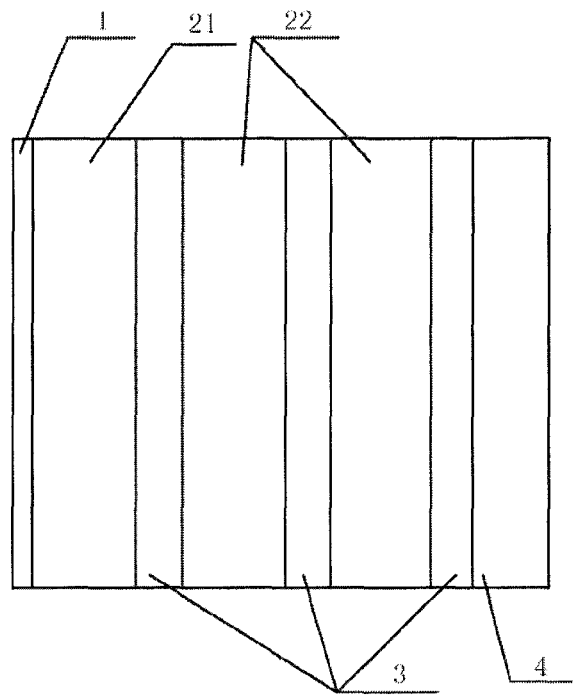
FIG. 1 is a schematic diagram of the windshield for the high-speed locomotive of one embodiment of the present invention.

FIG. 1 diagrammatically illustrates a windshield for a high-speed locomotive in one embodiment of the present invention. The windshield comprises an anti-reflection film layer 1; a first chemical tempering glass layer 21, coated with the anti-reflection film 1 on a first side of the first chemical tempering glass layer 21; two second chemical tempering glass layers 22, both located on a second side of the first chemical tempering glass layer 21 and bonded with each other via an adhesive film layer 3, wherein the second chemical tempering glass layer 22 adjacent to the first chemical tempering glass layer 21 is bonded with the first chemical tempering glass layer 21 via an adhesive film layer 3; an anti-splash film 4, located on an outer side of the outermost second chemical tempering glass layer 22 and bonded together with the outermost second chemical tempering glass layer 22 via an adhesive film layer 3; and a first electric heating element 5, disposed inside the adhesive film layer 3 which is in contact with the first chemical tempering glass layer 21.

Figure 2:
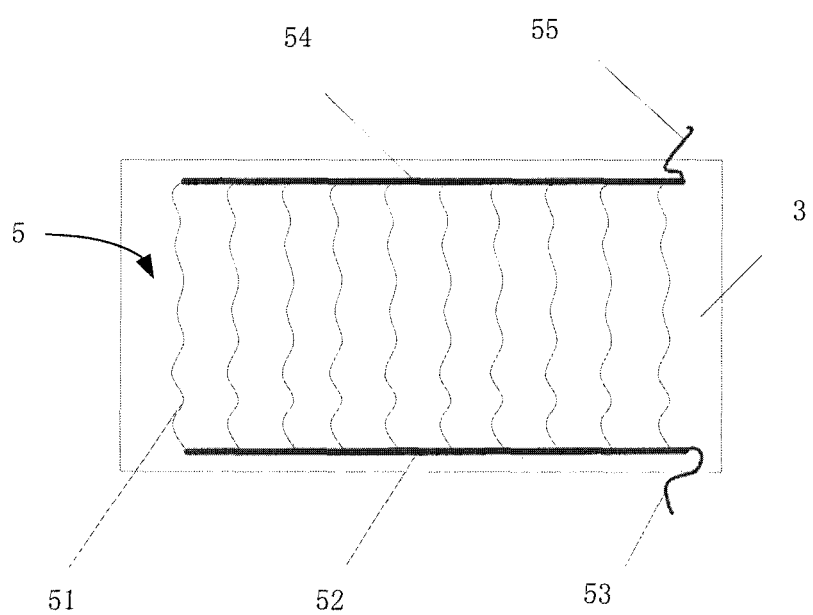
FIG. 2 is a schematic diagram of the electric heating element of one embodiment of the present invention.

FIG. 2 diagrammatically illustrates a first electric heating element 5 in one embodiment of the present invention. The first electric heating element 5 comprises electric heating wires 51 which are parallel arranged and are disposed inside the adhesive film layer 3 being in contact with the first chemical tempering glass layer 21; an input busbar 52, which is electrically connected with a first end of each of the electric heating wires 51 respectively; an output busbar 54, which is electrically connected with a second end of each of the electric heating wires 51 respectively; an input wire 53, which is electrically connected with the input busbar 52 and extended out of the high-speed locomotive windshield; and an output wire 55, which is electrically connected with the output busbar 54 and extended out of the high-speed locomotive windshield. When facing with the snow and freezing rain weather, the input wire 53 is connected with an output end of an external power supply and the output wire 55 is connected with an input end of the external power supply, so that the first electric heating element 5 form a closed circuit with the external power supply. The current supplied by the external power supply flows into the input wire 53 through its output end, then the current flows into the input busbar 52 and shunts to the parallel electric heating wires 51 which then generate heat to melt the snow and frost on the surface of the first chemical tempering glass 21 having the anti-reflection film layer 1, finally the current converges in the output busbar 54 and comes back to the input end of the external power supply through the output wire 55.

Preferably, the input wire 53 is connected with an output end of a thermostat and the output wire 55 is connected with an input end of the thermostat. The thermostat controls the first electric heating element 5 to be open or closed.

If meeting the rain, snow and other inclement weather, the snow and frost on the surface of the front windshield of the locomotive running at a high speed must be removed in time. In one embodiment of the present invention, the first electric heating element 5 is connected with the thermostat, through which the first electric heating element 5 is controlled to start heating at a presetting temperature, thus removing the ice and snow automatically under a low temperature, especially suitable for the north conditions.

The anti-reflection film layer 1 can be used for increasing the light transmission and improving the view definition of the locomotive driver. The anti-reflection film layer 1 is a $SiO_2$ monolayer film or a $TiO_2$ monolayer film or a $SiO_2/TiO_2$ double-layer film or a $TiO_2/SiO_2$ double-layer film or a $SiO_2/TiO_2/SiO_2$ multilayer film. Since the refractive index of the anti-reflection film 1 can be adjusted continuously, the refractive index of the front windshield can be reduced observably, thus making it has high light transmittance. Suitable heat treatment can make the Si—OH groups (or Ti—OH groups) in the film to aggregate into Si—O—Si (or Ti—O—Ti) crosslinked network structure, which gives the windshield good performance for the environmental stabilities (such as saline, humid, acid and alkali corrosion) and hardness. Using the multilayered film can further improve the environmental stabilities of the high-speed locomotive windshield and reduce the reflectance of the sun light on the front windshield surface. The thickness of the anti-reflection film layer 1 is from 100 nm to 500 nm in a preferred embodiment.

The first and second chemical tempering glasses layers are designed according to the design of surface type of the high-speed locomotive windshield and respectively have a surface stress of 700 MPa to 900 MPa, which can meet the safety requirements for the high-speed locomotive having a speed of more than 380 km/h and the requirements for the overall profile design of front windshield. The adhesive film layer 3 is bonded between the first and second chemical tempering glasses layers, among the second chemical tempering glasses layers, and between the outermost second chemical tempering glass layer and the anti-splash film layer respectively. A polyurethane film which has a perfect weatherability is chosen as the adhesive film layers 3. The thickness of the adhesive film layer 3 is 1.5 mm to 4 mm and the thickness of the anti-splash film layer 4 is 0.5 mm to 1.5 mm in a preferred embodiment.

For the high-speed locomotive windshield provided in this example of the present invention, the electric heating wires are disposed inside the adhesive film layer, and are connected to an external power supply through the wires, so as to electrically heat the high-speed locomotive windshield to remove the snow and frost on the outer surface of the windshield without affecting the transmittance of the windshield. If the snow and ice are condensing at the surface of the high-speed locomotive windshield and not being cleared promptly, it will not only reduce the transmittance and affect the driver's view but also be a serious threat to the safe operation of the locomotive, which will reduce the service life of the windshield.

Example 2

Figure 3:
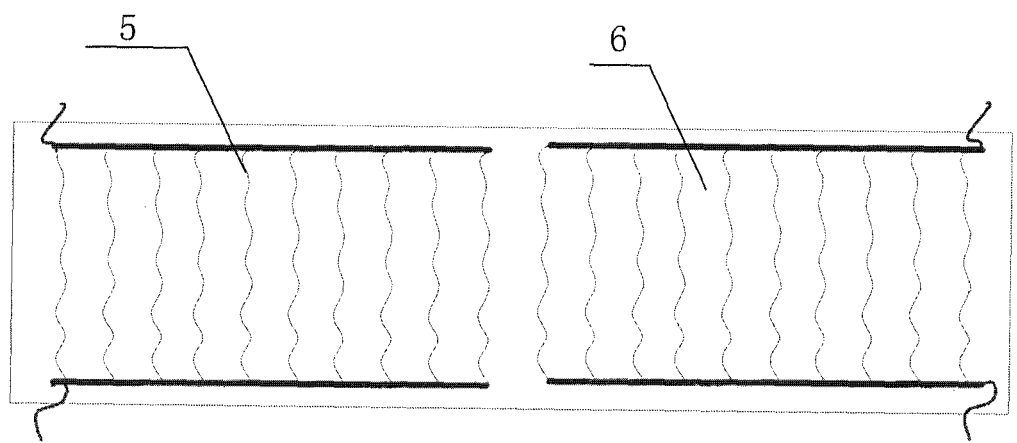
FIG. 3 is a schematic diagram of the electric heating element of one embodiment of the present invention.

FIG. 3 diagrammatically illustrates another kind of high-speed locomotive windshield. Compared with the above example, the windshield comprises two electric components, i.e. a first electric heating element 5 and a second electric heating element 6 respectively. These two electric heating elements 5 and 6 are connected in parallel and disposed inside the adhesive film layer 3 being in contact with the first chemical tempering glass layer 21. The first electric heating element 5 and the second electric heating element 6 are located in different positions of the high-speed locomotive windshield in this example. Taking the vertical centerline of the windshield as a boundary, the first electric heating element 5 is located in the left side of the windshield and the second electric heating element 6 is located in the right side of the windshield. The first electric heating element 5 comprises an input wire 53 which is connected with an output end of a first thermostat and an output wire 55 which is connected with an input end of the first thermostat, and the first electric heating element 5 is controlled by the first thermostat. The second electric heating element 6 comprises an input wire which is connected with an output end of a second thermostat and an output wire which is connected with an input end of the second thermostat, and the second electric heating element is controlled by the second thermostat. In other embodiments, the number of the second electric heating elements can be two, three or more, depending on the area size of the windshield and the actual use demand.

Since the high-speed locomotive windshield has a large area and the high-speed locomotive has a wide operation range, it may appear that snow and frost may exist on partial region of the locomotive front windshield. By setting the first electric heating element and the second electric heating element in different regions of the front windshield and controlling them respectively, the snow and frost on the front windshield can be removed more specifically, energy savingly and environmental friendly.

Preferably, the electric heating wire 51 has a diameter of 0.1 mm to 0.2 mm in the above examples of the present invention. If the diameter is too thin, it is easy to break the wire in the wire configuration stage, which will cause the electric heating element cannot work normally. But if the diameter is too thick, it will take up more space in the adhesive film layer, which will cause the adhesive film layer 3 cannot be firmly bonded with the first chemical tempering glass layer 21 coated with the anti-reflection film layer 1 and the second chemical tempering glass layer 22. So when the diameter of the electric heating wire is between 0.1 mm and 0.2 mm, it not only can work effectively for a long time but also can ensure the adhesive film layer has a good bonding ability.

Preferably, the electric heating wire is tungsten electric heating wire. Since it is inconvenient to overhaul the electric heating wires dispersed in the adhesive film layer, while the high-speed locomotive windshield generally has a service life of more than 10 years and is generally used under harsh natural environment, it is required that the electric heating wires must have sufficient stability and corrosion resistance. The tungsten electric heating wire has good plasticity and corrosion resistance, and will not deform even at high temperature. So the tungsten electric heating wire is especially suitable for the windshield of the high-speed locomotive having a speed over 380 km/h.

Preferably, the adhesive film layer 3 is a polyurethane film having a thickness of 1.5 mm to 4 mm in an embodiment of the present invention. The polyurethane film has good performance for the environmental stabilities. When the thickness is about from 1.5 mm to 4 mm, the film can not only embed the electric heating wire 51 but also meet the required adhesion between the first chemical tempering glass layer 21 and the second chemical tempering glass layer 22.

Preferably, the first chemical tempering glass layer 21 has a thickness of 8 mm to 10 mm in an embodiment of the present invention. The chemical tempering glass has good transmittance and excellent impact strength. The chemical tempering glass in the thickness of 8 mm to 10 mm has sufficient supporting ability, and can ensure the design of the front windshield to meet the requirement as much as possible.

Example 3

This embodiment of the present invention illustrates a method for the preparation of a windshield for a high-speed locomotive.

Step 1: The preparation of the anti-splash film layer, the adhesive film layer, the first chemical tempering glass layer coated with the anti-reflection film, and the second chemical tempering glass layers, which comprises:

1a: The preparation of the chemical tempering glass layers

1a1: The preparation of the first chemical tempering glass layer coated with the anti-reflection film According to the design of surface type of the high-speed locomotive windshield, the glass is formed by hot bending, and is prepared into chemical tempering glass layer by using chemical tempering technique; and finally the anti-reflection film layer is prepared on the outside of the glass layer by a sol-gel method.

The main raw material for the anti-reflection film is Ethylsilicate ($Si(OC_2H_5)_4$) or $Ti(OC_2H_5)_4$ Solvent and catalyst in an appropriate proportion are added into the raw material to yield a mixture, which reacts at 30-40☐ for 4 hr to yield a solution, and then the solution is aged at room temperature for 5-20 days to obtain the $SiO_2$ and/or $TiO_2$ sol. The obtained nanoporous $SiO_2$ and/or $TiO_2$ is coated onto the outside of the first chemical tempering glass layer by the high-speed spin coating or pulling method. The obtained coating stands for 1 hr in a clean and dry environment at room temperature, and then is pretreated at 50-70☐ for 30 min and heat treated at 100-150☐ for 4 hr to obtain the first chemical tempering glass layer coated with the anti-reflection film layer (having a refractive index of 1.13-1.40 on the spectrum from 300 to 2500 nm) The thickness of the anti-reflection film coating layer is 100 nm to 500 nm, and the thickness of the first chemical tempering glass layer preferably is 8 mm to 10 mm.

1a2: The preparation of the second chemical tempering glass layers

According to the design of surface type of the high-speed locomotive windshield, the glass is formed by hot bending and is prepared into the second chemical tempering glass layers by using chemical tempering technique. The thickness of the second chemical tempering glass layer is preferably 4 mm to 6 mm.

1b: The preparation of the adhesive film layer

The adhesive film layer 3 is made of hot melt adhesive with high weather resistance, preferably polyurethane film. The preparation of the adhesive film layer comprises:

The preparation of the first adhesive film layer, i.e. the adhesive film layer between the first chemical tempering glass layer and the second chemical tempering glass layer, comprising:

1b1: cutting an adhesive film into a designed size for the high-speed locomotive windshield, wherein the adhesive film preferably is a polyurethane film which preferably has a thickness of 1.5 mm to 4 mm.

1b2: determining the amount and layout of the electric heating wire, input busbar, output busbar, input wire and output wire, according to the heating demand.

There is only a first electric heating element 5 in this embodiment of the present invention. The first electric heating element comprises electric heating wires disposed uniformly within the adhesive film layer 3 which is in contact with the first chemical tempering glass layer 21, and comprises two busbars and two wires, i.e. an input busbar, an output busbar, an input wire, and an output wire. The input busbar is set along the location of the input end of the electric heating wires, and the output busbar is set along the location of the output end of the electric heating wires, allowing the electric heating wires in parallel connection. The input wire is electrically connected with the input busbar and the output wire is electrically connected with the output busbar.

1b3: The arrangement of the electric heating wires, input busbar, output busbar, input wire and output wire within the adhesive film layer 3 which is in contact with the first chemical tempering glass layer 21, comprising aspects described as below.

The electric heating wires are configured on the adhesive film layer with a wire-configuration machine.

The wire distance and other parameters of the wire-configuration machine are adjusted well according to the required amount and the layout of the electric heating wires. The cut adhesive film layer is located onto the roller of the wire-configuration machine. After adjusting the curvature of the electric heating wires, the configuration the wire is started, and at the end of the operation the both ends of the electric heating wires are coming out.

The input busbar and output busbar are arranged within the first adhesive film layer. The input busbar is connected with one end of each of the electric heating wires respectively, and the output busbar is connected with the other end of each of the electric heating wires respectively. The details are shown as below.

The adhesive film layer with the wires arranged therein is put onto the operating floor. The input busbar and output busbar are pasted on a preset position of the adhesive film layer using a conductive silver paste. The input busbar is connected with one end of each electric heating wire respectively, and the output busbar is connected with the other end of each electric heating wire respectively.

The input wire is connected with the input end of the input busbar, and the output wire is connected with the output end of the output busbar.

The layout and connection order of the electric heating wires, input busbar, output busbar, input wire and output wire can be adjusted according to the design.

1b4: the input wire and output wire are extended out of the first adhesive film layer.

1c: The preparation of the anti-splash film layer

The anti-splash film layer is prepared according to the design of surface type of the high-speed locomotive windshield. The anti-splash film is usually thick to improve the safety performance of the high-speed locomotive front windshield, preferably having a thickness of 0.5 mm to 1.5 mm, so that when the front windshield is subjected to an external shock, the anti-splash film can maintain the integrity and avoid production of slags which will cause threat to the driver safety when the glass was broken.

Step 2: the laminating of the anti-splash film layer, the adhesive film layers and the chemical tempering glass layers. The details are described as below.

Laying the first adhesive film layer on the first chemical tempering glass layer, extending the input wire and output wire out of the high-speed locomotive windshield, laying the second chemical tempering glass layer on the first adhesive film layer, laying an adhesive film layer on the second chemical tempering glass layer, repeating this step to complete laying of all of the second chemical tempering glass layers and the adhesive film layers, laying the anti-splash film layer on the last adhesive film layer; putting the laminated anti-splash film layer, adhesive film layers, the first chemical tempering glass layer and the second chemical tempering glass layers into a vacuum bag, vacuumizing the bag, and putting the bag into an air pressure kettle to react for 1.5 hours at 125 to 130° C. under a pressure of 1.12 Mpa; taking out the vacuum bag, waiting for the temperature to decreases to room temperature, and removing the vacuum bag to obtain the high-speed locomotive windshield.

In step 2, there are electric heating wires in the adhesive film layer. Therefore, if the reaction temperature is too high and the reaction time is too long, it is easy to make the electric heating wires deviate from the designed position, which will cause uneven heating or even partial burning during use. Conversely, if the laminating temperature is too low and the reaction time is too short, the adhesive film layer cannot reach its optimum viscosity, which will make the bonding between the chemical tempering glass not strong, and thus will shorten the service life of the high-speed locomotive windshield. By reacting for 0.5-1.5 hours at 125-130° C. under 1-1.5 Mpa, the electric heating wires can maintain the design shape and the adhesive film layer has good adhesion.

By the preparation method of the high-speed locomotive windshield in the present example, the windshield having electric heating wires arranged in the first adhesive film layer is produced. The electric heating wires of the windshield are connected to external power supply through the wires, so as to electrically heat the chemical tempering glass to effectively remove the snow and frost on the surface of the high-speed locomotive windshield without affecting the transmittance of the high-speed locomotive windshield. If the snow and ice are condensing at the surface of the high-speed locomotive front windshield and not being cleared promptly, it will not only reduce the transmittance and affect the driver's view but also be a serious threat to the safe operation of the locomotive, which will reduce the service life of the windshield. The method provided by this inventive example is simple in operation, suitable for mass production and capable of automated operation, with high efficiency and stable quality.

Preferably, the high-speed locomotive windshield is suitable for the train having a speed over 380 km/h. The high-speed locomotive front windshield is generally for outdoor use. In the winter, the temperature is low and there are usually a lot of ice and snow in the northern regions. If the snow and ice condense at the surface of the high-speed locomotive front windshield and are not cleared promptly, it will not only affect the driver's view but also be a serious threat to the safe operation of the locomotive, which will reduce the service life of the front windshield. Therefore, there is a great need for the high-speed locomotive windshield which can remove the snow and ice automatically.

Example 4

This embodiment of the present invention illustrates another method for the preparation of a windshield for a high-speed locomotive. This method is the same as that of the example 3 except for the amount and layout of the electric heating wires and the busbars.

In this embodiment, the windshield comprises two groups of the electric heating components. As referring to in FIG. 3, the first electric heating element is located in the left half of the windshield of the high-speed locomotive and the second electric heating element is located in the right half of the windshield of the high-speed locomotive, such that the first and second electric heating elements are separated from each other by the windshield's vertical centerline. The arrangements of the first and second electric heating elements are same as that of the first electric heating element in the example 3. In other embodiments, the number of the second electric heating elements can be two or more, depending on the size of the high-speed locomotive windshield and the demand for the use.

Since the high-speed locomotive windshield has a large area and the high-speed locomotive has a wide operation range, it may appear that snow and frost may exist on partial region of the locomotive front windshield. By setting the electric heating elements in different regions of the front windshield and controlling them respectively, the snow and frost on the front windshield can be removed more specifically, energy savingly and environmental friendly.

Obviously, the aforementioned embodiments are merely intended for clearly describing the examples, rather than limiting the implementation scope of the invention. The protection scope of the invention is defined by the appended claims. For those skilled in the art, various changes and modifications in other different forms can be made on the basis of the aforementioned description. Any obvious changes or modifications derived from the aforementioned description are intended to be embraced within the protection scope of the present invention.

We claim:

1. A windshield for a high-speed locomotive, comprising an anti-reflection film layer having a thickness of 100 nm-500 nm;
a first chemical tempering glass layer, coated with the anti-reflection film layer on a first side thereof;
at least two second chemical tempering glass layers located on a second side of the first chemical tempering glass layer, wherein one of the at least two second chemical tempering glass layer is bonded together with the first chemical tempering glass layer via a first adhesive film layer, and the at least two second chemical tempering glass layers are also bonded together via a second adhesive film layer, wherein the second adhesive film layer is a polyurethane film and has a thickness of 1.5 mm-4 mm;
an anti-splash film layer, located on an outer side of an outermost second chemical tempering glass layer and bonded together with the outermost second chemical tempering glass layer via a third adhesive film layer wherein the anti-splash film layer has a thickness of 0.5 mm-1.5 mm; and
a first electric heating element, disposed inside the first adhesive film layer in contact with the first chemical tempering glass layer,
wherein the first electric heating element comprises:
at least one electric heating wire, disposed inside the first adhesive film layer in contact with the first chemical tempering glass layer;
an input busbar, electrically connected with a first end of each of the electric heating wires;
an output busbar, electrically connected with a second end of each of the electric heating wires;
an input wire, electrically connected with the input busbar and extended out of the windshield; and
an output wire, electrically connected with the output busbar and extended out of the windshield,
wherein each of the first chemical tempering glass layer and the at least two second chemical tempering glass layers has a surface stress of 700 Mpa-900 Mpa,
wherein the first chemical tempering glass layer has a thickness of 8 mm-10 mm, and
wherein each of the at least two second chemical tempering glass layers has a thickness of 4 mm-6 mm.

2. The windshield of claim 1, wherein the anti-reflection film layer is a $SiO_2$ monolayer film, a $TiO_2$ monolayer film, a $SiO_2/TiO_2$ double-layer film, a $TiO_2/SiO_2$ double-layer film, or a $SiO_2/TiO_2/SiO_2$ multilayer film.

3. The windshield of claim 1, further comprising at least one second electric heating element in parallel connection with the first electric heating element.

* * * * *